ERASEABLE MEDIUM RECORDING APPARATUS WITH INFORMATION INDEXING

Filed Aug. 27, 1962 4 Sheets-Sheet 1

INVENTOR.
Jerome H. Lemelson
BY

INVENTOR.
Jerome H. Lemelson
BY

INVENTOR.
Jerome H. Lemelson
BY

INVENTOR.
Jerome H. Lemelson
BY

United States Patent Office 3,227,805
Patented Jan. 4, 1966

3,227,805
ERASEABLE MEDIUM RECORDING APPARATUS WITH INFORMATION INDEXING

Jerome H. Lemelson, 85 Rector St., Metuchen, N.J.

Filed Aug. 27, 1962, Ser. No. 219,609
13 Claims. (Cl. 178—6.6)

This invention relates to the recording and reproduction of information signals and is a continuation-in-part of my copending application Ser. No. 515,417 entitled Computing Apparatus filed June 14, 1955, now U.S. Patent No. 3,003,109 and application Ser. No. 668,348 entitled Magnetic Recording Systems filed on June 27, 1957, now U.S. Patent No. 3,051,777. More particularly, this invention relates to apparatus for recording and reproducing information in the form of image frames or the like by automatic and selective semiautomatic means.

The conventional thermoplastic recorder for recording image phenomenta in the form of deformations or ripple patterns in a flexible thermoplastic recording tape requires the use of a vacuum chamber in which a recording tape is driven at constant speed while an electron beam sweeps laterally back and forth across the tape. The drive is continuous and a series of motion picture frames are produced by virtue of motion of the type and the subsequent development of image patterns by means of heat. The conventional recording apparatus as illustrated and described in the December 1959 issue of The Journal of Applied Physics is capable of only recording motion picture phenomena due to the control and characteristics of the writing electron beam which is modulated by a video picture signal derived from the output of a television scanner or camera which operates at a frame frequency of 30 frames per second, and also due to the characteristics of the radio frequency heater which fixes or develops the image deformations in the film.

There is need for an erasable image recording apparatus capable of recording and/or erasing single frames for document record keeping and updating purposes as well as for the temporary storage of image information for computing or other functions.

It is a primary object of this invention to provide a new and improved recording and reproduction apparatus utilizing an erasable recording medium.

Another object is to provide an improved erasable recording apparatus for optical phenomena such as image fields, which apparatus will permit the selective recording, selective reproduction, and selective erasure of individual image frames without the need for chemical processing.

Another object is to provide an improved control system for an optical recording and reproduction system employing a thermoplastic recording member which will permit the selective recording, reproduction, and erasure of image patterns or portions of image patterns relative thereto.

Another object is to provide an improved means for altering portions of a recorded image field without physical contact therewith.

Another object is to provide an improved thermoplastic recording system which may be used for the performance of a variety of functions relating to pictorial information storage and retrieval.

Another object is to provide an improved recording system which may be used for the production of motion pictures from still picture phenomena.

Another object is to provide an improved means for erasing recordings on thermoplastic recording members.

Still another object is to provide a new and improved means for recording digital information on an erasable thermoplastic recording member.

Another object is to provide an improved television receiving and projection system utilizing a closed loop or continuously operating thermoplastic recording member as an image converting medium.

These as well as other objects of this invention will readily become apparent after reading the following description of the accompanying drawings in which.

The invention consists basically of a thermoplastic recorder which may be operated so as to permit the recording on single frames of the thermoplastic recording film of such phenomena as still pictures, document images or deformations reproducible as still images by the Schlieren optical system described in the December 1959 issue of the Journal of Applied Physics. The problem is complicated by certain characteristics of the thermoplastic recorder and recording requirements. The radio frequency (RF) heater used to develop the image deformation pattern in the thermoplastic film is located in the conventional thermoplastic recorder several frames beyond the scanning area. While the charge pattern provided on the surface of the thermoplastic film may persist for some time, to insure development of said deformation pattern for all situations, including those in which a single frame is recorded followed by a long time delay before the next frame is recorded, it is requisite that the frame just scanned be heated shortly after scanning. Selective or automatic control of said RF heater in synchronization with the movement of the tape and operation of the scanning recording beam is therefore generally a requisite for updating records such as single frame documents.

In numerous manually activated or automatically controlled document recording functions, frames of information such as document recordings will be replaced or altered along different portions of the recording film. For efficient operation, utilizing a thermoplastic recording system, it is requisite that an image be developed and set or frozen in the film without substantial delay after a charge pattern has been written onto the charge storage area of the film so that the film may be driven to position another frame or length thereof in the scanning field of the electron writing gun and the next document may be recorded with minimum delay. A requisite in the recording of image ripple patterns in thermoplastic material is that the film must be cooled within a limit of time after formation of the image. For example, if a developing temperature is used which allows the image to form in half a second, the film must be cooled within half a minute. In the conventional thermoplastic recording of motion pictures, the film is constantly driven and cooled by running the film through a slot from the high vacuum chamber where recording takes place to a chamber containing gas at several hundred microns where it is cooled by gaseous conduction. Since in recording updating and altering single frames of document images, it may be required to reverse the film drive to attain a frame or film location on the take up reel, means are provided as part of this invention to guarantee that all frames will be properly cooled after formation of the frame ripple pattern to assure retention of all recorded frame images regardless of how the film is transported during the next recording or monitoring operation.

Figure 1:
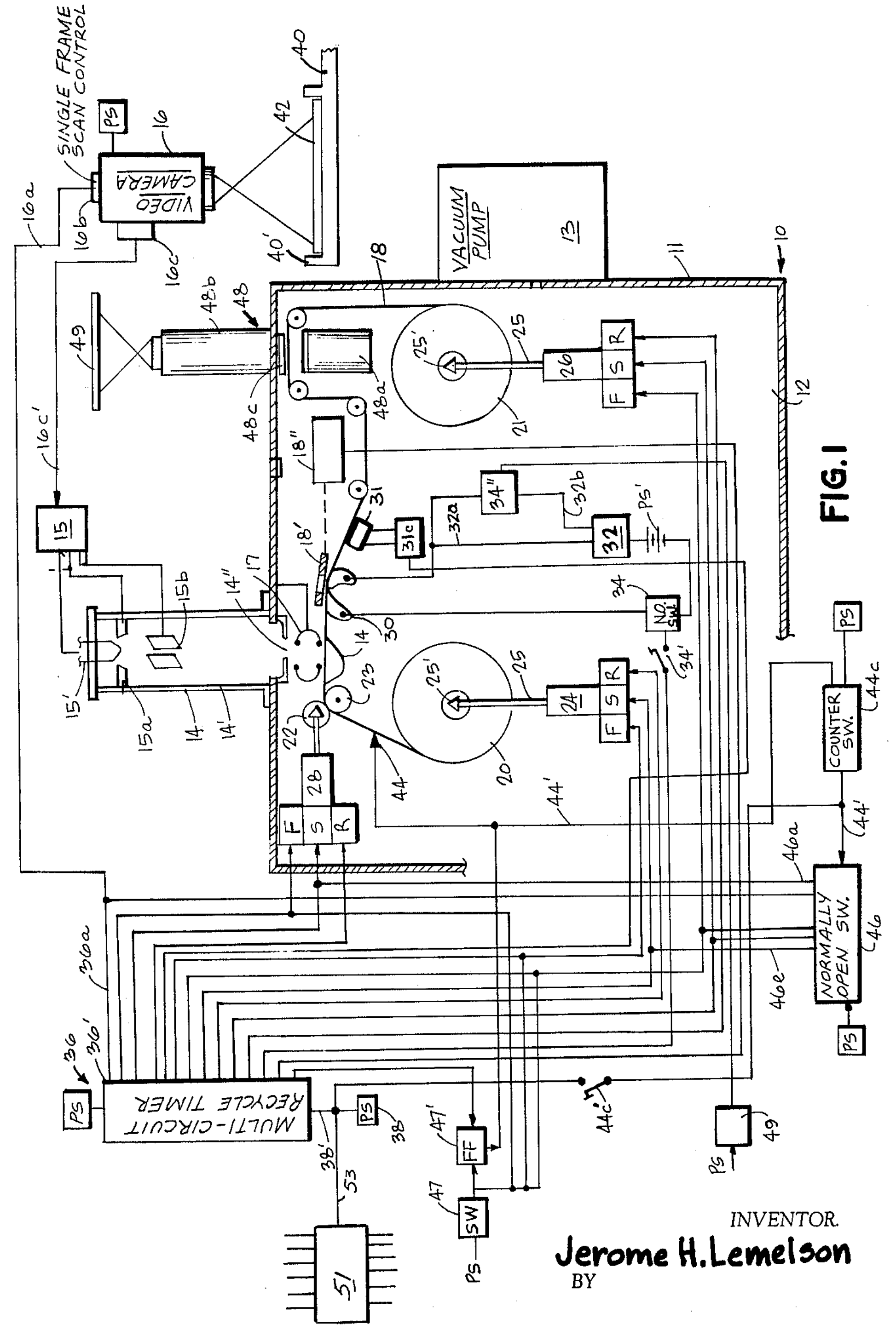
FIG. 1 is a schematic diagram of a thermoplastic recording apparatus which may be used for recording individual frames of images derived from scanning photographs, documents or other still phenomena.

Reference is made to the drawings in which FIG. 1 shows a thermoplastic frame recording apparatus which may also be used as an animated cartooning apparatus 10 comprising a sealed recording enclosure 11, the interior 12 of which is at a low vacuum pressure and evacuated by means of a vacuum pump 13, which automatically operates to retain a predetermined vacuum. Housing 14' of an electron gun 14 is sealed to the housing 12 and communicates therewith by means of an opening 14'' in its end wall through which the beam of the gun may pass in entering the chamber 11. Numeral 17 refers to control means for the beam for guiding it as it focuses at the surface of an elongated thermoplastic film 18 above where it passes over an electrode guide 19. The thermoplastic recording tape 18 is driven from a supply reel 20 to a takeup reel 21, each of which reels is power driven by respective motors 24 and 26. The tape drive is effected by a capstan drive wheel 22 powered by a motor 28, which cooperates with depressor wheel 23. Positioned beyond the scanning area is a radio frequency heating head 30 operative for heating the thermoplastic tape whereby an image ripple pattern is produced therein in accordance with the charge pattern generated in the charge storage layer of the film by the action of the beam from gun 14. The radio frequency heating head 30 is powered by an R.F. generator 32 to which it is connected by means of a normally open switch 34. The electrode 15' of the electron gun is modulated by the picture signal output of a video camera-scanner 16, the optical system of which is provided to scan an image field defined by a positioning table 40 or screen which has stops 40' or the like for prepositioning documents, cartoons, photographs or the like in the image field 42.

Numeral 16*a* denotes a control signal input to a single frame scanning controller 16*b* for the video camera 16, shown in detail in my copending applications 544,991 and 668,348. When trigger control 16*b* is energized by a pulse from control signal input 16*a*, the read beam of the camera 16 is automatically caused to effect one cycle of scanning of the image field and then stop scanning. The resulting video picture signal together with the necessary sync components is passed over line 16*d* from camera output 16*c* to a signal converter 15 where it is converted to a high energy signal for modulating the electrode 15' and deflection means 15*a* and 15*b* of the electron gun 14.

A single frame recording controller 36 is illustrated in FIG. 1, and comprises a multicircuit, self-recycling timer or programmer 36' actuated when a switch 38 is closed to cause the tape 18 to be driven in the direction of takeup reel 21 whereby the frame following that just exposed and developed is itself exposed and developed. Control is effected by signals transmitted over respective outputs from timer 36' to respective pulse activated start and stop controls of the various servos.

In a cycle of operation, the operator first places the desired image or picture in the scanning field 42. He then actuates starting control 38 which energizes the recycle multicircuit timer 36'. The starting controls for the forward drives of motors 26 and 28 are first energized by signals generated by timer 36' on the respective input lines from 36' to said motors. The frame to be exposed to the image charge pattern is sufficiently in advance of the scanning area to permit the tape to be accelerated to recording speed. When the leading edge of the next frame to be exposed approaches the start of the scanning area of the electron gun 14, a signal on line 36*a* from timer 36' is passed to the single frame scanning control 16*b* of the video scanner 16. The resulting composite video picture signal generated at the output 16*c* of camera 16 is used to modulate the electron beam of gun 14 which creates the image charge pattern on the surface of the frame of the tape to be exposed. The tape continues in its movement towards the takeup reel 21 so that the frame just charged passes the induction heating head 30 which heats the thermoplastic recording layer of film 18 and effects development of the corresponding image frame ripple pattern therein from which the image may be optically reproduced. The induction head 30 is also energized and controlled in its operation by a signal from timer 36' which closes normally open switch 34 for a period of time and at a time such that only the length of the film 18 comprising the frame containing the electron gun charge pattern just recorded will be heated thereby.

The switch 34 is maintained closed by a signal from program controller 36 for just a time interval necessary to heat just the length of the film 18 containing the charge pattern derived from scanning the document 42.

The image ripple pattern develops automatically in the heated frame of the film 18 after which the heated frame length of the film is driven across a cooling device 31 including an electrically operated semiconductor thermoelectric element which serves to cool the film below its melting point so that the ripples or deformations are frozen in its surface. While the thermoelectric element in cooling device 31 may be operated continuously, for certain applications it may be energized only during the period the frame just heated is passed thereover and control or energization of said thermoelectric element may be effected by a signal or signals generated by controller 36 in sequence with the other control signals so as to effect cooling of the heated portion of the film.

Numeral 31' designates the control for the thermoelectric cooling device 31 which may also include, if the thermoelectric element in cooling device 31 is operated continuously, means for advancing cooling device 31 to engage and cool the film 18 when the leading edge of the heated portion thereof approaches cooling device 31 which action is controlled by programmer 36.

Other means for cooling film 18 include running the tape through a slot from the high vacuum chamber 12 where recording takes place to a chamber pressurized at several hundred microns where it is cooled by gas conduction. Although not shown, such a chamber may be provided within housing 11 and the controller 36 programmed or preset to effect movement of the frame just heat developed to said gas containing chamber and its retention therein as part of the cycle for sufficient time for the heated thermoplastic material to cool below its melting point whereafter it may either be stopped or automatically reverse driven as described to position the next frame for recording.

If a cold wheel having a gas film of adequate pressure maintained between the wheel and the film is used for cooling, the controller 36 may be programmed to pass at least that section of the film just heated over said wheel to effect "freezing" of the thermoplastic image ripple pattern in the thermoplastic material shortly after it develops on passing across the radio frequency head 30, prior to reversal or further prepositioning of the recording film 18.

Numeral 29 designates a negatively charged plate or electrode disposed beyond the cooling device 31 over which the frame or length of film 18, which was just recorded on, is driven under the cyclic control of controller 36 which device 29 is operative to discharge the charge pattern remaining in the film which generally remains even after heat development of the ripple pattern. It is desirable to effect such discharging immediately after development of the ripple pattern so that, if it is necessary to alter or erase the ripple pattern by heating the thermoplastic layer well above its softening point, the remaining charge pattern will not affect such erasure.

After movement of the filmstrip across charge erasure plate 29, the timer 36' effects by the generation of a plurality of control signals, and transmission to respective controls F and S, the stoppage of motor 26, reverse drive of motor 28 and reverse drive of motor 24 to effect the prepositioning of the tape for repetition of the above cycle with the frame following that just exposed and developed positioned for the next frame following that just recorded on, to be scanned and heat developed as described.

In the event that is desired to selectively position and stop a predetermined image frame in the scanning field of the electron gun, and/or to record thereon, a control is provided which comprises a presettable predetermining counter 44c in the output of a scanner 44 adapted to pick up frame indicating marks or signals recorded preferably along a border of tape 18. The output of counter 44c is connectable to the energizing input 38′ of the timer 36′ through a manually operated switch 44c′ and a flip-flop switch 47′ which is closable to permit the signal from timer 44c to pass therethrough when a control switch 47 is closed. Closure of switch 47 also gates a power supply to the starting controls F of the drive motors for the recording tape 18 as well as to the close-switching input to switch 47′. When 44c uncounts, it energizes timer 36′ which cycles, as described, to effect a recording of the image scanned by camera 16 on a predetermined frame of tape 18. If it is desired to erase a ripple pattern already recorded on a selected frame of the tape 18, the RF generator 32 is provided with two outputs 32a and 32b. Output 32a generates sufficient energy in the transducer 30 to effect heat development of the ripple pattern therein. Output 32b generates sufficient radio frequency energy to energize the head 30 to effect erasure of any deformation or ripple pattern already in the selected frame by heating the film well above 120° C., the softening point of the thermoplastic. A manually closable, bistable switch 34″, when closed, results in the RF head 30 being energized at the higher RF potential when switch 34 by cycle controller 36 is closed for erasing the selected frame or tape length.

Numeral 18 designates a servo such as a solenoid for moving a masking means 18′, such as an RF shield in alignment with a portion of the head 30 to prevent heating beyond a line or area defined by marking means 18′. The servo 18″ may be controlled by a signal generated at the start of the cycle or at a predetermined time interval therein by the controller 36′. Numeral 34′ designates a manual switch in the switching circuit to normally open switch 34 to prevent energizing of the RF heater 30 during a cycle in the event it is desired to just preposition a selected frame for monitoring said frame.

Monitoring or viewing a selected frame is effected by projecting light through the frame and through a Schlieren optical system designated by the notations 48a and 48b with the light source being located in housing 48a. The film strip 18 passes through said system and the single selected frame may be monitored after it is selectively positioned in the field of the optical projection system 48 by the control means described or by manual control of the drive motors for the film. Numeral 48c refers to a sprocket and shutter system driven by holes in the film which permits motion picture phenomenon to be projected onto the viewing screen 49 if the film drive means is operated continuously.

In using the apparatus shown in FIG. 1, the function of creating animated cartoons or the like may include the need to record the same image on a plurality of frames on the tape in a tandem array. A control is therefore provided in FIG. 1 which will effect the tandem recording of the same image on any number of predetermined frames of the tape without the need to reverse the tape.

A predetermining counter and relay 44c which may be preset by the operator to become actuated provides a control signal at its output 44′ upon the receipt of a predetermined number of input pulses at its input 44″. The output 44′ is connected to the switching input of a normally open switch 46 between a power supply PS and a plurality of circuits 46a and 46e which are connected to controls for stopping the tape transport drive motors after a predetermined number of frames have passed the scanning field.

Figure 2:
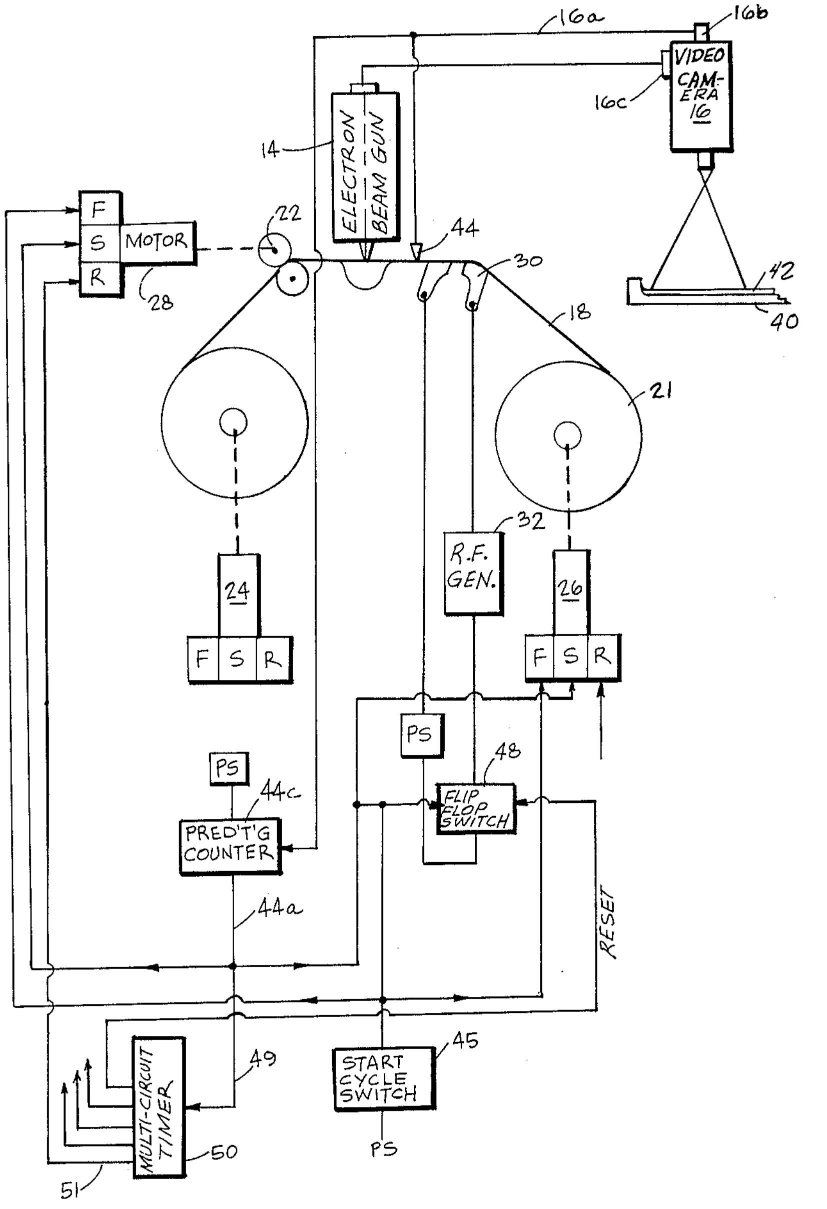
FIG. 2 is a schematic diagram of a modified form of control of the apparatus illustrated in FIG. 1.

The control diagram for multiple frames is repeated in FIG. 2 showing a modified form. It is assumed that frame position indicating means in the form of marks, ripples or the like, are recorded at frame intervals at the border of tape 18, either prerecorded thereon or recorded each time the tape is scanned, and that a pick-up transducer 44 is positioned to provide a pulse output each time it scans a frame position indicating mark. The border of film 18 may also have a magnetic recording strip provided thereon and the frame indicating means may be pulse signals recorded thereon.

Numeral 45 refers to a starting switch and numeral 44c to a manually presettable, predetermining counter relay which provides a control signal at its output upon receipt of a predetermined number of pulses at its input derived from frame marker scanner 44. The counter 44c may be preset by hand to become energized with the receipt of any predetermined number of pulses from counter 44c or by means of a presetting means such as a card or key reader or computer.

If frame marker scanner 44 is properly positioned, its pulse output generated upon uncounting may be used to trigger the deflection chain control 16b of video camera scanner 16 by connection of the output of scanner 44 with the single frame scanning control input 16a.

Start switch 45 gates a pulse to each of the starting controls F of tape drive motor 28 and reel motor 26 and also pulses a flip-flop switch 48 connecting the RF heater 30 in circuit with R.F. generator 32. The signal output of predetermining counter 44c, indicates that the desired number of frames have passed the scanning field which output is passed over respective circuits to the stop controls S of motors 26 and 28 as well as to the switching input of flip-flop switch 48. The former action stops the tape drive and the latter breaks the circuit between heater head 30 and power supply 32. If it is desired to drive the tape in reverse thereafter a sufficient degree to place the next frame thereof (to be exposed and developed) in a position whereby it may be accelerated to constant recording speed for the next cycle, a pulse from counter 44c is passed to the energizing input 49a of a multicircuit self recycling timer 49 the multiple outputs 49′ of which may be used to energize the appropriate motor reverse controls R and stop control S to effect said tape positioning and to reset or open flip-flop switch 48.

Figure 3:
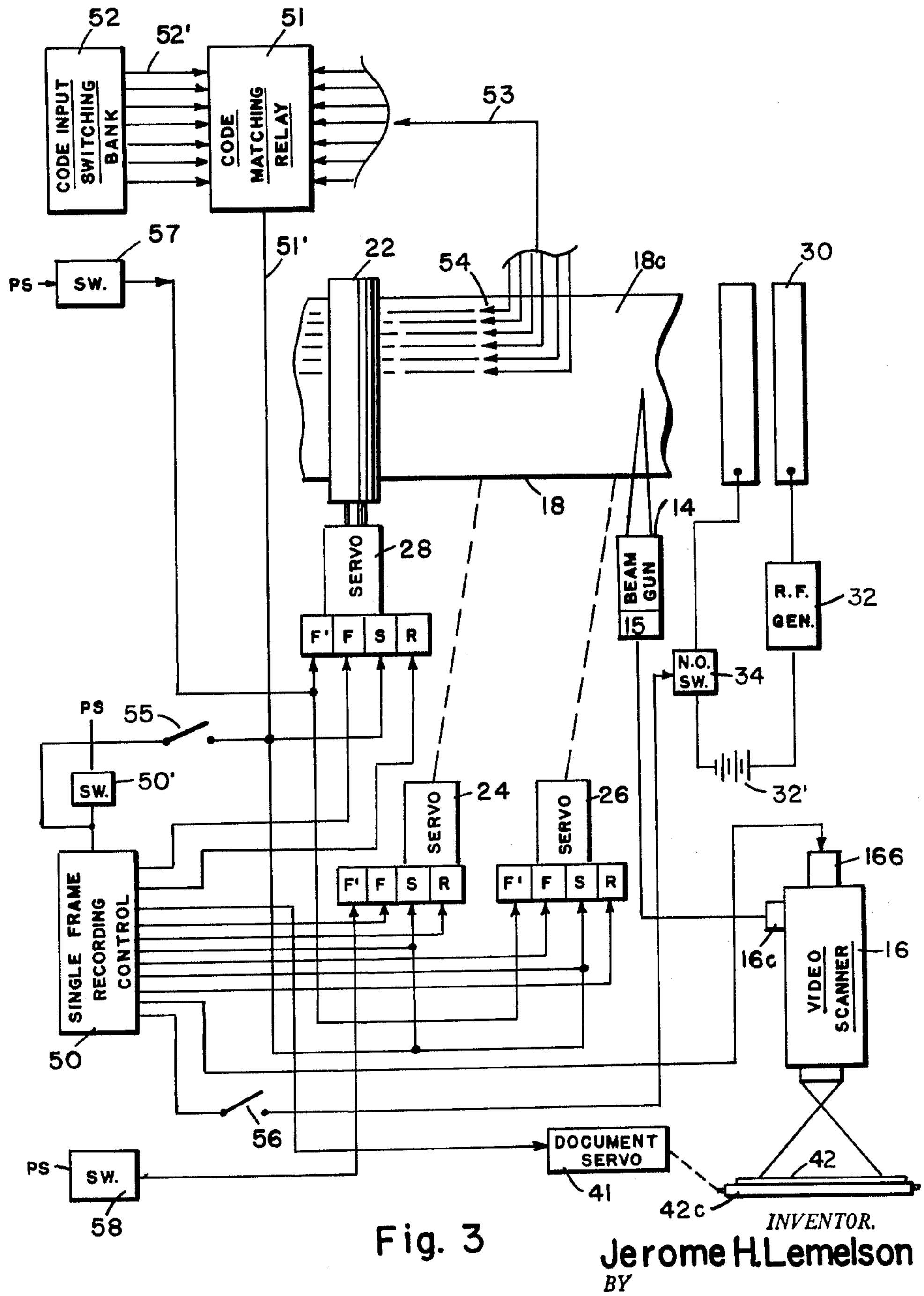
FIG. 3 is a schematic diagram showing a further form of frame selection and control as applicable to apparatus of the type illustrated in FIG. 1.

FIG. 3 illustrates further modifications to the apparatus of FIGS. 1 and 2 in which means are provided for effecing the recording of a predetermined information or image signal onto a selected frame of a thermoplastic recording member which may be any frame thereof including a single frame situated between two other frames already containing recordings. For various recording and record keeping functions involving still image recording such as the recording of documents, drawings or the like, it may be desirable to update or change certain of said records located in the middle of a tape frame or the like. Accordingly, means are provided in the form of a code matching relay 51 shown in detail in my said copending applications, which when preset by means of a multiple selection switch input may be used to stop the recording member or film 18 with a predetermined or selected frame thereof moving into or prepositioned in the recording electron beam scanning field.

A selection code such as a binary code is set up in the code matching relay 51 by means of actuating bistable switches of a bank of selection switches 52 which may be manually or otherwise preset with the desired parallel code. As the recording film 18 is driven along its transport, parallel binary code feedback signals are generated which are indicative of the frame of the tape or film 18 passing a plurality of scanning relays 54 which scan a border area 18c of said tape. The scanners 54 may comprise photoelectric relays such as a bank of photomultiplier tubes having optical means responsive to generate pulse signals when scanning thermoplastically recorded code marks such as a binary array of spots, ripples or lines appearing in a sequence along the border area *18c*. The outputs 53 of scanners 54 are passed to the feedback inputs of code matching relay 51. When the coded input array or selection code set-up in relay 51 by switches in selection switches 52 is matched by the code present at the frame scanners 54, the selected frame is in a predetermined position relative to the recording or reproduction transducers and a signal is generated on output line 51' of code matching relay 51 which may be used as a control means to effect recording and/or reproduction relative said selected frame.

The apparatus of FIG. 3 contains in addition to the controls illustrated in the apparatus of FIG. 1, the following modifications. The film transport drive motors 24, 26, and 28 are each provided with fast drive controls for fast forward and reverse movement of the film to rapidly preposition that section of the film containing the selected frame relative to the recording and scanning transducers. Fast forward drive controls F' are illustrated which effect, when activated by control pulses, the fast forward movement of the tape. The notation 57 refers to a switch for energizing the fast forward drive controls of all servos driving the tape or film 18. A similar switch and control 58 is provided for effecting reverse fast drive of said film by energizing the control F' of motor 24.

After energizing the controls F' and setting the desired selection code or switching array in the code matching relay, the film is driven until the feedback code matches the input selection code effected by closing and opening switches in the bank 52. When the codes match, the output 51' of code matching relay 51 is pulsed or becomes energized and effects stoppage of the film drive servos by energizing the stop controls S of each. The selected frame is then centered in the optical reproduction scanning field where it remains while the image thereon is projected onto a viewing screen. If recording is desired on the selected frame, switches 55 and 56 are closed prior to energizing or actuating start switch 57. The output 51' bypasses the single frame recording control 50' through switch 55 and when an output signal appears on 51' it activates the multicircuit recycle timer 50 which thereafter effects the control functions described for moving the film triggering the information signal generating means and energizing the film heating means 30 at the proper interval to develop the recording image in just the selected frame of the film. Numeral 56 refers to a manually operated switch which is retained open when it is not desired to permit the sequential controller 50 to operate the heating means by preventing closure of the normally open switch 34 and 18F refers to a single frame of the image recording area of the film 18.

The strip area 18C of the film 18 may be thermoplastic recording material whereupon the scanners 54 are electro-optical sensors or if 18C is magnetic recording material such as magnetic oxide coated on the singular laminated thermoplastic recording member the scanners 54 are conventional magnetic heads. The code matching relay may also be replaced by a presettable, predetermining counter with the feedback pulses indicative of each frame movement being generated by pulse or spot recordings on the film picked up by a single transducer or pickup.

If the binary code recorded on the border strip 18C changes at predetermined intervals or lengths within each frame, then recording and/or erasure of images or image strips may be effected along predetermined or selected strip area within each frame provided that the proper picture signal is generated by camera 16 in scanning a similar lateral strip area of the image field 42 and that the controller 50 or multicircuit recycle timer is adjusted to effect the necessary tape or film movement and/or control of the RF generator 32 for energizing the RF transducer 30 when just the selected strip area of the tape requiring erasure or on which recording is desired is in alignment with said transducer. Switch 57 is provided to throw a second power supply 32'' into circuit with the RF generator to increase the power energizing the head 30 so that erasure of a selected strip area or frame of the tape may be effected. By dividing each frame into lateral strip or band areas for selective recording and/or erasure, records on each frame such as individual line entries may be updated, erased or modified as desired.

FIGS. 1 to 3 have illustrated means for selectively recording and reproducing frames of image information relative to an erasable recording member and the apparatus may be applicable to such functions as business document recording, the recording of technical documents, literature, books, drawings and the like. However, for certain business functions it may be required to alter or add to one or more documents either randomly or regularly and in an orderly manner. For example, a business storage and updating requirement may comprise the storage of a plurality of documents such as accounting forms on which one or more entries may be made regularly or in a random fashion. In a simple situation, it may be required to add, for example, a line of alphanumeric characters to a document such as one listing a weekly, monthly, or other periodic transaction such as an insurance payment, club plan payment, etc.

Figure 4:
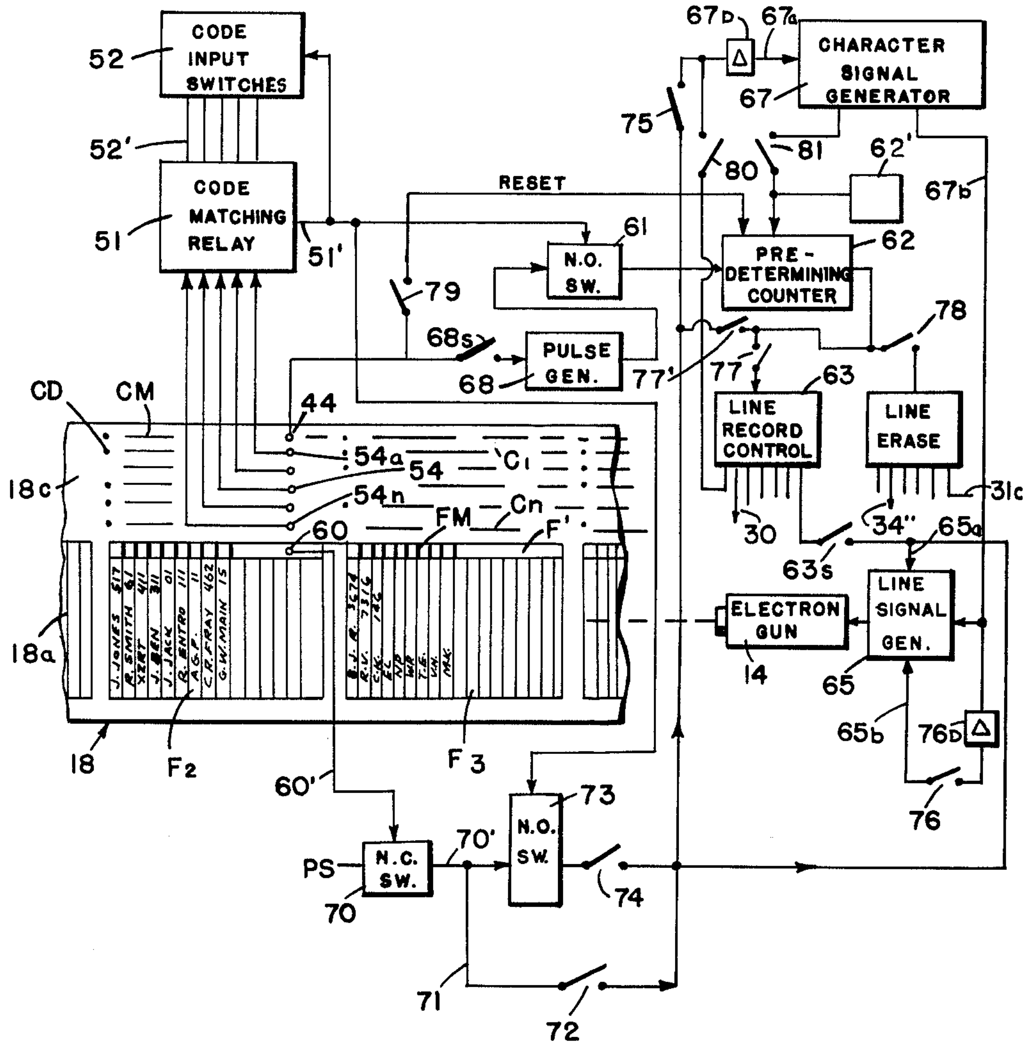
FIG. 4 shows a line recording arrangement.

Provided in FIG. 4 which shows a modified recording apparatus of the type illustrated in FIGS. 1 to 3, are means for effecting the recording of a line of characters on one or more document recordings such as image frames recorded on thermoplastic or other recording material capable of being scanned and having a predetermined area or areas thereof provided with new images or erased. In FIG. 4 the recording medium 18 comprises an elongated flexible thermoplastic recording tape which is transported as described by means of a plurality of servo driven devices or by any suitable controlled servo driven means. In its simplest form, the recording member 18 consists of a first band area portion *18a* on which are recorded in a tandem array a plurality of document frames F1, F2, F3, etc. Adjacent these frames on a band area *18c* occupying the remainder of the film are a plurality of recording tracks including a single track CM on which is recorded marker signals M aligned with the leading edge of each frame to indicate the position thereof and a plurality of tracks C*l* to C*n* on which are recorded bit codes such as binary codes referred to by the notation CD with at least one binary code aligned with a marker signal CM for classifying or at least partly defining the contents of the document. For example, the parallel bit code CD may define in code notation the name of the account, address, etc. A bank 54 of scanning relays of the type provided in FIG. 3 contains at least one relay adapted to scan a respective one of the code recording tracks C*l* to C*n*. The outputs of the relays in banks 54 extend to respective inputs of a code matching relay 51 which functions as hereinafter described, to provide a pulse signal on its output 51' when the input 52' from a bank 52 of code generating selection switches match the feedback signals generated when the scanning bank 54 scans a parallel code CD similar to the code generated on lines 52'. The energization of the output 51' of comparator 51 is then utilized either to effect the immediate recording of one or more lines of characters on the selected frame or to trigger means for effecting such recording at a predetermined time thereafter such as the time it takes for the lateral recording band area immediately adjacent the last line of characters recorded on the document or any other predetermined character recording area.

The first recording function to be described will be that in which it is required to record the same line of characters along the same lateral band area or line of each document. The signal or signals required to trigger, control, and modulate the beam of the recording electron gun 14 are stored in a temporary storage device 65 which receives said signal or signals from a signal generating device 67. Both units 65 and 67 may comprise any suitable type of signal recording and reproduction means such as a magnetic tape, disc, or drum, static storage unit or the like. The beam modulating and trigger signal is held in storage in unit 65 until the trigger input 65*a* is energized whereupon the beam is controlled to scan that portion of the moving recording member 18 aligned with the beam to effect the storage of a charge from which a line of characters such as alpha numeric characters may be developed as a ripple pattern by heating and cooling as described. Whenever the input 65*a* is energized, a signal is generated and transmitted from 65 to modulate and control the electron gun 14 unless an automatic erasure means, which will be hereafter described, is actuated.

To effect recording of the new line of characters along the row or line down the document which is adjacent to the line on which the last row of characters was recorded, a method is employed in which a recording or mark is provided adjacent each row of characters as it is recorded. This is provided on the border area F' of each document which, if scanned, may be used to indicate the first free lateral area or line of the document by the lack of such a character line indicating mark FM thereon. A transducer 60 such as a photomultiplier tube with the necessary associated optical system is positioned for scanning the border areas F' of each document as the tape 18 moves. The output 60' of scanner 60 is passed either as a series of pulses if the line recordings on F' comprise interrupted marks or as a continuous signal if said recordings on F' comprise a continuous mark until the position of the last recorded line is reached after which the output 60' either becomes energized or deenergized depending on the characteristic of the recordings FM. Output 60' extends to the switching input of a normally closed switch 70 which generates a signal at its output 70' when head 60 is scanning beyond the last line indicating recording FM of a frame. The output of switch 70 is then passed over a line 71 when a control switch 72 is manually closed, to the trigger input 65*a* of the line signal generating device 65 and the signal output of the latter is utilized to control and activate the beam of the electron gun 14 to record said line of characters on the next free or non-recorded row of the document. The signal output of device 65 is of such a characteristic that the recordings along column or track F' will be extended the degree that the newly recorded character line extends to be utilized thereafter in effecting a recording along the next free row of the document.

In another mode of operation it may be required to record the same row of alpha-numeric characters along the first free row area of only certain of the document recordings provided on the recording member 18, which recordings may be indicated by a specific code or codes generated by the input means 52 to the comparator relay 51. For example, means 52 may comprise a punched card reader with means for automatically feeding various punched cards thereto either in synchronization with movement of the recording member 18 or under the control of a feedback signal generated each time the output 51' of comparator or code matching relay 51 is energized. Line 51*a* is shown extending to an input to unit 52 which, if said unit is a punched card reader, may extend to activate the servo for feeding a new card to the reading transducing means of means 52 to generate a new code on the outputs 52' thereof. If it is so required to record the same line of characters on the first lateral free areas of only certain of the document recordings, switch 72 is opened. The output 70' of switch 70 extends to a normally open switch 73 activated to pass the pulse generated at output 70' through a switch 74 to the trigger input 65*a* of signal generator 65 when the switching input to switch 73 is energized by the pulse signal output of code matching relay 51. The switch 73 preferably has a self-contained delay control which automatically switches it to an open condition a time interval after being closed during which a length of the recording member 18 equivalent to the length of the frame being scanned, passes the pickup transducers.

In another mode of operation it may be required to record a different line of alpha-numeric characters onto the first free line area of either consecutive image frames or predetermined image frames as indicated by the consecutive codes generated by means 52 when operated as, for example, a card reading device. Assuming that signal generating means 67 and selection code generating means 52 each contain respective stacks of cards or recording frames which, when individually read, provide respectively a frame selection code and an associated line picture signal to be recorded on the next free space of the frame. The output of switching device 73 is passed in addition to the trigger input 65*a* to signal storage device 65, also, when a switch 75 is closed to an input 67*a* to signal generator 67 after passing through a delay line or relay 67D. Thus, after the signal recorded in temporary storage device 65 is read out and utilized to control and modulate the electron gun 14 for recording a line of first characters along the first free lateral row or line area of a first document, the signal generator 67 is energized to reproduce the next picture signal or character line generating means at its output 67*b* which extends to the input of temporary storage device 65. The signal generating unit 67 may comprise a servo operated means for driving a plurality of recordings provided either on magnetic tape or cards to be individually reproduced and generated at output 67*b* shortly after the input 67*a* becomes energized. The temporary storage unit 65 may either be operative to automatically effect the erasure of each signal recorded therein whenever a new signal is generated on 67*b*. In FIG. 4 it is assumed that each signal generated at output 67*b* contains a component to which a relay 76 is responsive providing thereafter a signal on an erasure input 65*b* to the temporary storage unit 65.

In a further mode of operation, it may be required to effect either the recording of alpha-numeric characters along any predetermined lateral area of a document or the erasure of any predetermined row or rows of characters already recorded on a document. Apparatus is provided in FIG. 4 for automatically effecting either of these functions. While each line of characters of a document may be indicated by a respective parallel bit code to be reproduced by the bank 54, it will be frequently preferable to utilize said parallel bit codes to either indicate only such document or cross-references thereto and to utilize either pulse recordings provided on the marker signal track CM or a pulse generator and counter arrangement to indicate when a particular recording area of a predetermined or selected frame is aligned with the recording electron gun 14. In FIG. 4 the marker pickup head 44 is connected to a pulse generator 68 when a switch 68S is closed. The output of 68 is passed through a normally opened switch 61 when the output 51' of code matching relay 51 is energized, said switch 61 being slow-to-open after closing by a time interval during which the entire frame or document recording passes the pickup heads. The output of generator 68 is thus passed through switch 61 to the feedback input of a predetermining counter 62 which is preset either automatically or by manual means 62' to generate a control signal on its output when 62 zeros, which control signal may either be passed to a line recording controller 63 or a line erasure controller 64. The controllers 63 and 64 are multi-circuit recycle timers such as hereinabove described which are respectively operable to effect the functions described. For example, 63 provides the trigger signal on input line 65*a* to line signal storage device 65 for effecting the image charge pattern recording for said line of characters. It is also operable to effect operation of said radio frequency heating transducer 30 at the proper instant to heat only that lateral storage area of the frame containing the charge pattern of the line of characters just recorded. It is also operative to effect control of the masking means and recording tape cooling means at the proper instant during the cycle but not control of the servos driving the tape unless respective manual switches in the outputs of 63 are closed when it is desired to either stop or return the tape to a predetermined location. Multicircuit sequential controller 64 has its plural outputs connected primarily to the heating controller 34" and cooling control 31C and does not effect the modulating signal storage device 65. It is also noted that the output of pickup 60 is passed to the line recording controller 63 each time a signal is generated on the beam trigger readout input 65*a* so that control is effected of the tape heating head 30 such that only that portion of the frame thereof on which the line of characters is recorded as a charge pattern, is heated to effect the development of the ripple pattern therein.

If it is desired to effect erasure of the same line of each document, manual switch 77 is opened and switch 78 closed. The trigger signal to line erasure controller 64 may then be derived from the output of predetermining counter 62 which may be recycled by pulse signals derived when reproduction scanner 44 scans frame marker signals M by closure of switch 44S connecting the output of pickup head 44 directly to the resetting input of counter 62.

A number of variations in the apparatus illustrated in FIG. 4 are noted. The picture signal generated by signal generator 67 and stored in storage device 65 may be of analog or digital characteristic and may comprise, not only a signal operative to control the beam of the electron gun 14 to generate more than one line of characters, but also operative to effect the recording of characters extending longitudinally along each frame as, for example, two or more numbers defining a column of numbers, art, design work or the like. As stated, the pulse generator 68 may be eliminated if line positional indicating pulses are recorded on track CM. Also parallel codes recorded across area 18*c* may also be utilized to indicate various positions or line locations within each frame.

While the recording member 18 is illustrated as an elongated, flexible recording tape or film of thermoplastic material it may also comprise a disc, drum, or a plurality of individual record cards containing image frames and associated pulse and binary codes as illustrated. If the document recordings are provided individually or as a plurality of recordings on different record cards, suitable card feeding and guiding means are preferably provided to automatically pass each card so that the recording frame or frames thereof pass through the scanning field of the electron writing gun 14 and the code bearing portion 18*c* is passed in alignment with a bank of scanning relays such as 54. Operation of such a card reading device may be cyclically controlled either in synchronization with the means for conveying the cards through the reader or by means of a sync signal generated by the leading edge of the card as it is scanned or actuates a limit switch. Thereafter the operation and scanning of the card is controlled similarly to the apparatus illustrated in FIG. 4. The apparatus of FIG. 3 illustrates a document transfer servo means 41 controlled by multi-circuit timer 40 to position a document in the field of the video scanner and 50 may be similarly controlled to advance record cards through the scanning field of electron gun 14 by controlling movement of a document feed means or conveyor 42*c* operative to remove cards individually from a stack or magazine of said cards.

If ultraviolet sensitive heat developable photographic film such as Kalvar recording film, is used in place of thermoplastic recording material, the electron gun 14 will be replaced by an electro-optical system including either a conventional cathode ray tube or a character generating tube such as the Charactron with optical projection means coupled thereto for projecting a line or lines of characters to be recorded on the lateral band area following the last recording or on any predetermined, non-developed area of the recording film, preferably by controlling the movement of the film or frame and stopping it in the scanning field of the electro-optical device. Positioning of the desired portion of the frame in the scanning field of the electro-optical device may be effected by means of the apparatus illustrated in FIG. 4 such as by utilizing the pulse generated on input 65*a* to effect stoppage of the recording member servo drive means to position the desired lateral recording band area in said scanning field.

If it is desired to record characters along a predetermined section of the selected or next free lateral row or band area of the recording frame, the beam modulating and control signal read out of temporary storage unit 65 may contain blanking portions which are operative to provide those areas of the recording band without charge patterns in the respective charge storage areas of the recording member so that when heat is applied to said band area, no ripple patterns will be generated therein.

If it is desired to selectively erase one or more characters from a band area already containing a line or plurality of characters certain of which are desired to be retained on the band area, the write beam generated by the electron gun 14 or a beam generated by an auxiliary gun may be provided which is both deflection and intensity controllable by a video-type signal to effect erasure of just a predetermined portion of the selected band area by generating the beam, while it scans said predetermined portion, at such an intensity that it is operative to heat the thermoplastic recording material intersected thereby to a sufficient temperature that the ripple formations in the heated area will smooth out and disappear under the effects of surface tension. Such a beam heating technique may be utilized to supplement or replace the radio frequency transducer 30 in a thermoplastic recording apparatus. In fact, the selective erasure of any predetermined area in the scanning field of such a heating beam may be utilized to effect selective erasure of any area or areas of a thermoplastic recording member by prepositioning the recording member relative to the electron gun generating said beam and deflection controlling the beam by means of a video type signal which is also operative to intensity control the beam to effect the heating of the area scanned thereby and the subsequent erasure of predetermined portions of said area.

Depending on the potential or intensity of the electron beam, the same beam utilized to effect erasure of that area of a thermoplastic recording member it intersects and scans may also be utilized to effect the development of an image ripple pattern in the area scanned thereby provided that a charge pattern is already stored in the corresponding charge storage layer of the tape when so heated or is stored thereafter in said charge storage area before the thermoplastic material of the area scanned has dropped in temperature whereby the ripple pattern will not develop. In other words, it is herein proposed in accordance with this invention to provide a thermoplastic recording apparatus which consists of means for generating a plurality of electron beams one of which is operable for heating a predetermined area or areas of the thermoplastic recording member intersected and scanned thereby and the other of which is operable for generating image charge patterns in the area scanned by the heating beam either just prior to or after the heating function. If both beams are deflection and intensity controlled by respective signals which are generated in synchronism with each other, various recording functions may be performed such as the addition or erasure of one or more lines or portions of lines of characters, the alteration of drawings, etc.

If the heating beam is operative to charge the charge storage area of the recording member, the charge may be immediately dissipated from the storage layer of the recording member after the predetermined area of the film is heated by the beam by passage of the recording member across a negatively biased pin or plate after which the area so heated may be scanned by a beam operative to effect storage of an image charge in said storage layer which effects the formation of a corresponding ripple pattern in the molten portion of the film. As stated, the same beam utilized to effect the generation of an image charge pattern may also be utilized to heat any predetermined area of the recording member in advance of the generation of said image charge pattern by first intensity controlling the beam to a potential necessary to effect heating the thermoplastic material to a molten condition, deflection controlling said beam to scan the predetermined area and, immediately thereafter, deflection controlling the beam to scan said heated area or a portion thereof while intensity controlling the beam to effect storage of the charge pattern in the charge storage level of the recording member so that the corresponding image ripple pattern will develop in said thermoplastic material. Such control may be effected by generating a single video type signal at the control inputs of the electron gun which is operative to effect said double scanning as described.

It is noted that the apparatus hereinabove described may include reproduction transducing means such as a scanning electron beam adapted to scan recordings provided as described and means for selectively deflection controlling said beam to scan and read predetermined areas of the recording member.

A latitude of modification and substitution is intended in the foregoing disclosure, and in certain instances some features of the invention will be used without a corresponding use of other features. Accordingly it is appropriate that the appended claims be construed broadly and in a manner consistent with the spirit and scope of the invention.

I claim:

1. An image recording apparatus comprising an erasable recording member, electron beam generating means, deflection means operatively associated with said beam for causing said beam to scan a given image field, transport means for conveying said recording member through said scanning field to produce erasable image charge patterns on said member by said beam, means operatively coupled to said electron beam generating means and said deflection means for generating discrete single frame video signals for modulating said beam in accordance with said video signals and for causing said beam to scan said field, selection means operative to move a selected portion of said member into said given field, first control means for actuating said transport means to move said selected portion of said member into said field, means for generating a first control signal upon the arrival of said selected portion at said field, second control means responsive to the application thereto of said first signal for actuating said video signal generating means to generate a single frame picture signal, the application of said last named picture signal to said electron beam generating means and said deflection means being operative to modulate said beam in accordance with variations in said picture signal and to cause said deflection means to control said beam to effect scanning of said selected portion of said field, an image pattern being thereby recorded on said selected portion of said member.

2. A recording apparatus as defined in claim 1 wherein said recording member is a flexible thermoplastic recording film, said video signal generating means is a video camera means, and including heating means selectively operative to heat the selected portion of said member just scanned by said beam to develop a ripple pattern image recording in said member.

3. A recording apparatus as defined in claim 2 wherein said means for developing said recorded signal comprises heating means disposed adjacent to said scanning field of said electron beam, said heating means comprises an electrically operated heating transducer for heating a band area of a scanned portion of said member to cause a ripple pattern to be formed therein in accordance with said charge pattern, and third control means for effecting the electrical actuation of said heating transducer when said scanned portion is moved into alignment therewith and the deactuation of said transducer as said scanned portion is completely removed from alignment with said transducer.

4. A recording apparatus as defined in claim 2 wherein said recording member includes frame numerically designating indicating marks capable of being sensed to produce electric signals representing such marks and presettable counting means responsive to the application thereto of said last named signals for effecting a movement of said member by said first control means until said counting means arrives at a chosen setting, said setting corresponding to the marks of a particular portion of said member to be positioned in said scanning field.

5. A recording apparatus as defined in claim 4 and further including an optical system for viewing the charge pattern on a scanned portion of said member.

6. A recording apparatus comprising an elongated thermoplastic recording member, a border on said member having indicia thereon indicative of numerical designations for successive frames therein and scannable to produce combinations of electric signals representing said indicia respectively, electron beam generating means, deflection means operatively associated with said beam for causing said beam to scan a given field, transport means for conveying said recording member through said scanning field to produce image charge patterns on said member by said beam, means for scanning said border as said member is moved by said transport means, means for generating single frame video signals operatively coupled to said electron beam generating means and said deflecting means for modulating said beam in accordance with said video signals and for causing said beam to scan said field, first control means for actuating said transport means to move said member through said scanning field, presettable means for generating chosen coded combinations of signals, means for comparing the output of said signal code combinations with the combinations generated through the means scanning of said border by said border scanning means, means responsive to the matching of a given preset signal code combination with a scanned signal code combination for generating a signal to halt the movement of said member when the selected frame of said member having said preset signal code combination on its portion of said member's border comes into said scanning field, said first control means generating a first signal when said last named frame enters said scanning field, second control means responsive to the application thereto of said first signal for actuating said single frame video signal generating means to generate a single frame video picture signal, the application of said last named picture signal to said electron beam generating means modulating said beam in accordance with said picture signal and causing said deflection means to effect scanning of said field for said single frame, said picture signal being thereby recorded on said predetermined selected portion of said member in a charge pattern.

7. A recording apparatus as defined in claim 6 wherein there is further included thermoplastic charge pattern developing and thermoplastic charge pattern erasing means and means for selectively energizing said developing and erasing means to effect recording on and removal of information from said selected frame.

8. A recording apparatus comprising electron beam generating means, deflection means operatively associated with said beam for causing said beam to scan a given field, record cards each respectively having a recording area containing an erasable recording material, means for individually feeding said cards whereby their recording areas move in a path through said field to produce erasable image charge patterns on said areas by said beam, means for generating single frame video signals operatively coupled to said electron beam generating means and said deflecting means for intensity modulating said beam in accordance with variations in said video signals and for causing said beam to scan said field, selection means operative to move a predetermined card into the scanning field of said beam, first control means for actuating said card feeding means to move said pretermined card into said field and to generate a first signal upon the arrival of the recording area of said card at said field, second control means responsive to the application thereto of said first signal for actuating said video signal generating means to generate a single frame picture signal, the application of said last named picture signal to said electron beam generating means and said deflection means intensity modulating said beam in accordance with said picture signal and causing said deflection means to effect scanning of said field by said beam for recording said single frame picture signal as a charge pattern on the recording area of said predetermined card.

9. A recording apparatus as defined in claim 8 and further including means for developing said charge patterns, as image patterns and for erasing developed image patterns.

10. A recording apparatus as defined in claim 9 wherein said cards contain identifying indicia thereof capable of being scanned to produce coded combinations of electrical signals representing said indicia, scanning means for scanning said indicia as said cards are moved by said feeding means to produce said last named signals, means for generating a given signal combination code, means for comparing said last named code with the outputs of said scanning means and means responsive to a matching of a scanned signal combination with said given signal combination in said comparing means for issuing a signal for halting said card feeding means when the card having the indicia represented by said given signal combination enters said scanning field.

11. A recording apparatus as defined in claim 6 and further including means for relatively moving said recording member and said beam generating means, means for controlling relative movement of said recording member and said beam to position a selected area of said recording member in the scanning field of said beam, said last named means being operative for positioning a selected recording area in the scanning field of said beam including a predetermined strip thereof adapted to have a line of selected alpha-numeric characters recorded thereon, and means responsive to said positioning for causing said beam to scan said strip area to record said alpha-numeric characters thereon.

12. An image recording apparatus comprising an erasable recording member, electron beam generating means, deflection means operatively associated with said beam for causing said beam to scan a given image field, transport means for conveying said recording member through the scanning field of said beam to produce erasable image patterns on said member by said beam, means operatively coupled to said electron beam generating means and said deflection means for generating discrete single frame video signals for intensity modulating said beam in accordance with said video signals and for causing said beam to scan said field, selection means operative to move a frame portion of said member through said given field, first control means for actuating said transport means to move said frame portion of said member into said field, means for generating a first control signal upon the arrival of the leading edge of said frame portion at said field, second control means responsive to the application thereto of said first control signal for actuating said video signal generating means to generate a single frame picture signal, the application of said picture signal to said electron beam generating means and said deflection means being operative to modulate said beam in accordance with variations in said picture signal and cause said deflection means to control said beam to effect scanning of said frame portion of said recording member and record an image charge pattern on said selected frame portion of said member in accordance with variations in the intensity of the beam and means selectively operative thereafter to develop said recorded signal as an image pattern on last named portion.

13. An optical recording apparatus comprising an elongated flexible thermoplastic recording member, electron beam generating means, deflection means operatively associated with said beam for causing said beam to scan a given path across said recording member, transport means for conveying said recording member through the scanning field of said beam to produce erasable image charge patterns on said member by said beam, means operatively coupled to said electron beam generating means and said deflection means for generating discrete single frame video signals for intensity modulating said beam in accordance with said video signals and for causing said beam to scan said path, selection means operative to move a selected predetermined portion of said recording member into said beam path, first control means for actuating said transport means to move said predetermined portion of said member through said beam path, means for generating a first signal upon the arrival of said selected portion at said electron beam generating means, second control means responsive to the application thereto of said first signal for actuating said video signal generating means to generate a single frame video picture signal, the application of said picture signal to said electron beam generating means operative to intensity modulate said beam in accordance with variations in said picture signal and means causing said deflection means to control said beam to scan across said recording member and record an image charge pattern on said selected portion of said member and heating means selectively operative thereafter to heat and develop an image ripple pattern on said last named portion.

References Cited by the Examiner

UNITED STATES PATENTS

| | | | |
|---|---|---|---|
| 2,721,990 | 10/1955 | McNaney. | |
| 2,985,866 | 5/1961 | Norton | 178—6.6 |
| 3,008,066 | 11/1961 | Newberry | 178—6.6 |
| 3,025,344 | 3/1962 | Bosustow | 178—6.6 |
| 3,030,441 | 4/1962 | Nemeth | 178—6.6 |
| 3,051,777 | 8/1962 | Lemelson | 178—6.6 |
| 3,113,179 | 12/1963 | Glenn | 178—6.6 |
| 3,121,216 | 2/1964 | Wolfe | 178—6.6 |
| 3,131,257 | 4/1964 | Wallace | 178—6.6 |

DAVID G. REDINBAUGH, *Primary Examiner.*

STEPHEN W. CAPELLI, *Examiner.*

H. W. BRITTON, *Assistant Examiner.*